United States Patent
Bellifemine

(10) Patent No.: US 7,651,266 B2
(45) Date of Patent: Jan. 26, 2010

(54) TEMPERATURE MEASURING DEVICE PARTICULARY OF A PATIENT

(75) Inventor: Francesco Bellifemine, Varese (IT)

(73) Assignee: Tecnimed S.R.L., Varese (IT)

( * ) Notice: Subject to any disclaimer, the term of this patent is extended or adjusted under 35 U.S.C. 154(b) by 239 days.

(21) Appl. No.: 11/912,867

(22) PCT Filed: Apr. 27, 2006

(86) PCT No.: PCT/IB2006/003859

§ 371 (c)(1),
(2), (4) Date: Oct. 26, 2007

(87) PCT Pub. No.: WO2007/054821

PCT Pub. Date: May 18, 2007

(65) Prior Publication Data

US 2008/0187022 A1    Aug. 7, 2008

(30) Foreign Application Priority Data

Apr. 29, 2005 (IT) ........................ MI2005A0772

(51) Int. Cl.
   *G01J 5/00* (2006.01)
(52) U.S. Cl. ..................................... 374/121
(58) Field of Classification Search ............... 374/121, 374/133, 100, 131; 600/474
   See application file for complete search history.

(56) References Cited

U.S. PATENT DOCUMENTS

| 5,017,018 | A | 5/1991 | Iuchi et al. |
| 6,179,785 | B1 | 1/2001 | Martinosky et al. |
| 6,386,757 | B1 | 5/2002 | Konno |
| 6,439,768 | B1 * | 8/2002 | Wu et al. ............... 374/169 |
| 2002/0123690 | A1 | 9/2002 | Fraden |
| 2002/0181539 | A1 | 12/2002 | Sato et al. |

FOREIGN PATENT DOCUMENTS

| JP | 01095245 A | 4/1989 |
| WO | WO 99/39166 A1 | 8/1999 |

* cited by examiner

*Primary Examiner*—Andre J Allen
(74) *Attorney, Agent, or Firm*—Greenblum & Bernstein P.L.C.

(57) ABSTRACT

It is disclosed a device (100) for measuring a patient's temperature using an infrared thermometer (1) to detect the intensity of an infrared radiation coming from the body of that patient, whose temperature is wished to be known; the device further comprises a room-temperature sensor to send said temperature to a memory (38). A processing unit (33) receives as an input the room-temperature signal (B) and a temperature signal (A) proportional to the infrared radiation, the room-temperature signal (B) enabling the processing unit (33) to determine a corrective parameter to rectify the temperature (A) detected by the sensor member (7) and to determine the patient's real temperature. The invention allows the problem due to the non-stabilisation in the thermometer environment to be solved.

43 Claims, 4 Drawing Sheets

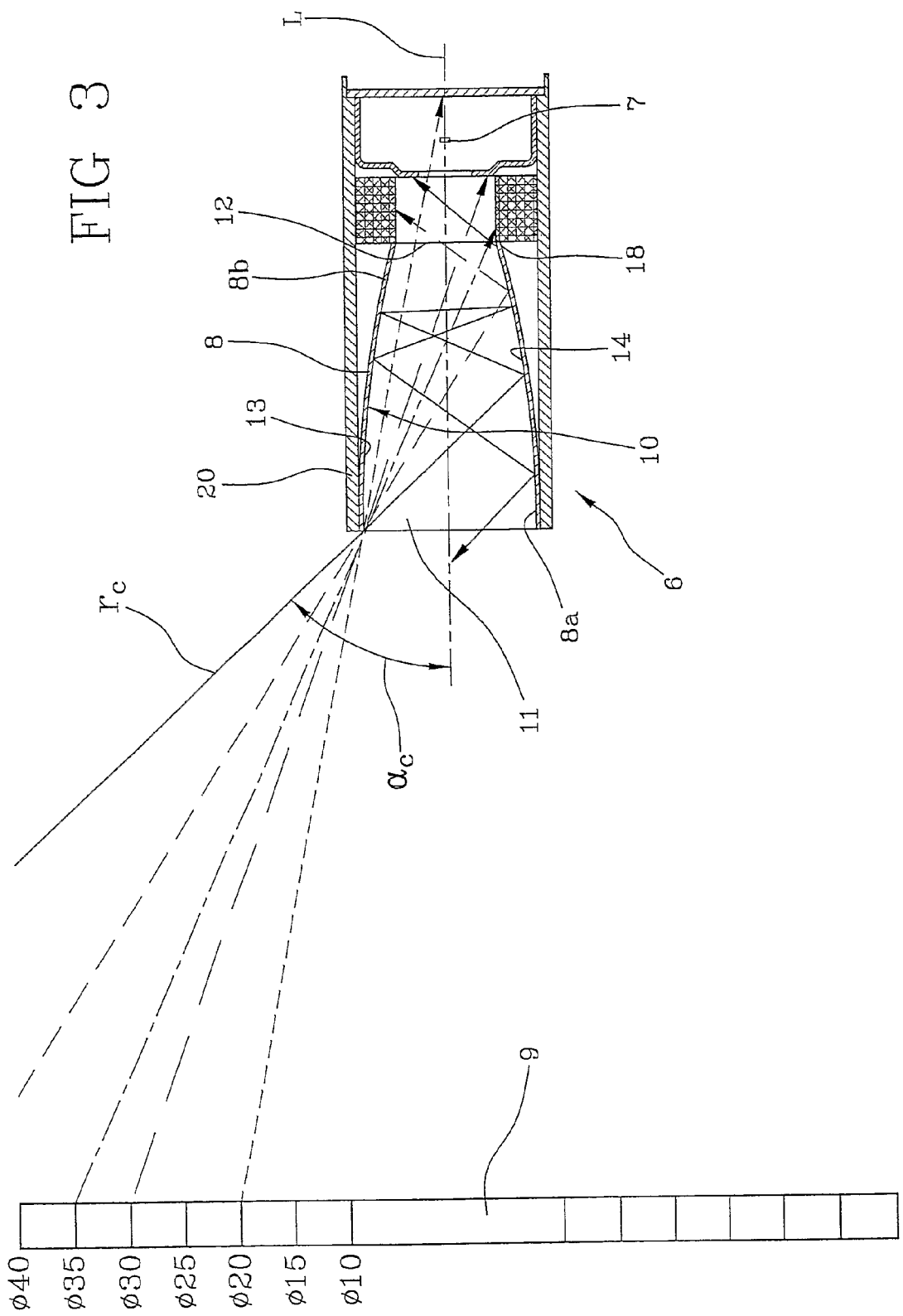

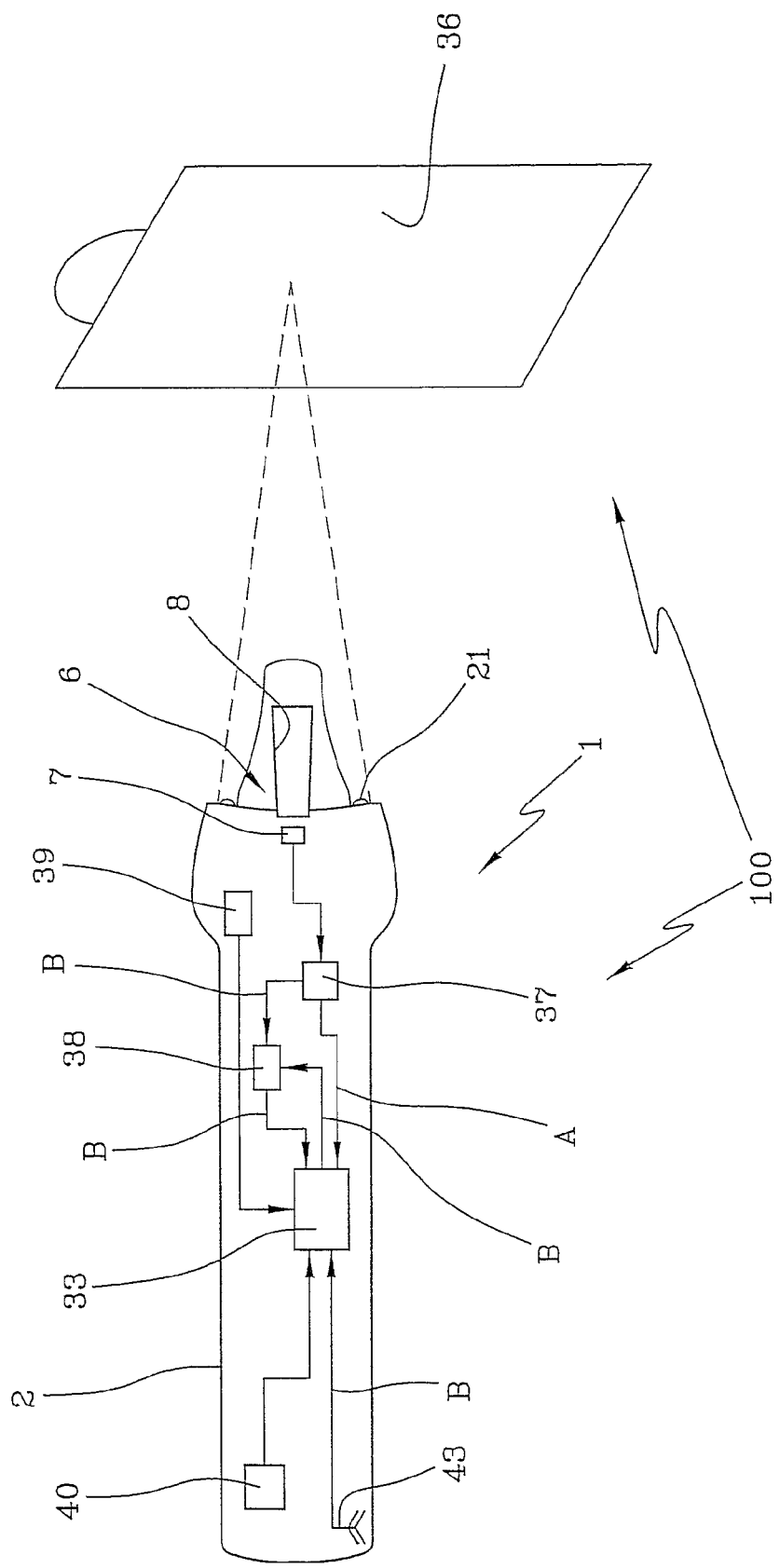

TEMPERATURE MEASURING DEVICE PARTICULARY OF A PATIENT

The present invention relates to a temperature measuring device, in particular for measurement of a patient's temperature, exploiting use of infrared thermometers.

It is known that beside traditional thermometers such as mercury thermometers reading the temperature when in contact with the patient for example, infrared thermometers which are able to detect the temperature of a given subject based on an infrared emission generated thereby have been recently spread on the market.

In particular, the infrared thermometers comprise a reading section in which an infrared-radiation sensor operates, to said sensor being conveyed the infrared radiation emitted from a region of the patient's body of which a thermal detection is required.

The infrared thermometers that are presently available on the market can be substantially divided into two big families: partly-invasive thermometers and non-invasive thermometers.

In the first type of infrared thermometers it is provided that a thermometer portion or probe be inserted into the auricle of the subject whose temperature is to be measured, so that the infrared radiation of this region can be conveyed to a sensing member.

By virtue of the thermal stability of the concerned detection region, thermal readings of fair accuracy and repeatability can be obtained.

While these values are generally valid, the just described thermometers however highlight some limits connected with use of the thermometers themselves under hygienic conditions, which involves the necessity to use protection caps for the probe; in addition they are not very practical in use because the thermometer probe is in any case a bothersome foreign body to be partly introduced into the patient's auricle.

In the second type of infrared thermometers, the non-invasive ones, the thermometer end designed to convey the infrared radiation to the sensing member is provided to be held either in contact with or spaced from the surface of the subject whose thermal level must be known.

With this second type of thermometers to be held at a distance, in order to have a good reading of the thermal level the thermometer itself must be positioned to a predetermined distance, within well restricted ranges, from the detection surface.

In fact it is essential that the sensor designed to detect the infrared radiation be reached by the emissions from the patient submitted to reading and in particular from a predetermined area of said patient.

It is to be noted that the same Applicant has conceived different systems for pointing and positioning the detecting portion of an infrared thermometer to the correct location relative to the subject on whom the thermal detection is to be carried out (see publication No. PCT/IT98/00379, for example).

It is also to be pointed out that the infrared thermometers with contactless measurements as well as those providing contact measurements typically detect the temperature of a given portion of the forehead or head (temple, central forehead region, neck back, ear region) of a patient.

However, the concerned temperature is clearly affected by the room temperature where the patient is. It is apparent that a patient with a given inner temperature will have different frontal temperatures depending on whether he/she is in a hot or cold environment.

Obviously, the infrared thermometer will measure the patient's forehead temperature and then suitably correct the detected temperature depending on the room temperature in order not to give a wrong measurement. In fact, it is the real inner temperature of a subject that one wishes to know and not that of a predetermined outer region of same (forehead, face, etc.).

One of the most important, problems to which the contactless thermometers are subjected is exactly that of determining the corrective parameter taking into account the room temperature where the subject is.

In order to at least partly solve this drawback, common contactless infrared thermometers are provided with an inner room-temperature sensor capable of detecting said room temperature and supplying the logic control unit of the thermometer with such a value.

Depending on the detected room-temperature value, the processing unit rectifies the patient's temperature thereby giving a correct value of the inner temperature of the subject submitted to measurement.

While the known art briefly described above has allowed reliable temperature measurements to be obtained for a patient, the same however has shown to have limits and/or operating drawbacks.

It is actually to be noticed that the non-stabilisation in the environment where the thermometer is involves generation of wrong measurements.

In fact, for instance, should the thermometer stay in an environment with a temperature different from that of the environment where the subject submitted to temperature measurement is, the room temperature detected by the thermometer would be different from that required for achievement of a correct estimate.

If, for example, measurement is carried out after quickly taking the thermometer into the new environment, the temperature measurement will be rectified based on a wrong room-temperature parameter and therefore a wrong result will be produced.

Yet, should the thermometer be kept in an environment with a variable temperature or in any case a temperature different from that of the environment where the subject is (let us think for example of a thermometer contained in a physician's pocket and therefore directly in contact with the physician's body), wrong room-temperature measurements would be obtained and consequently the measurements of the subject's true temperature would be wrong as well.

Under the present situation the invention aims at substantially solving the above mentioned drawbacks.

A first aim of the invention is to make available a temperature-measuring infrared device capable of solving the problem connected with the non-stabilisation of the environment where the thermometer is.

Accordingly, it is an object of the invention to enable a more reliable measurement of the patient's temperature avoiding detection errors due to an incorrect measurement of the room temperature.

It is a general object of the invention to make available an infrared thermometer provided with all technical features necessary for a good operation of same, i.e. correct contactless pointing, correct conveying of the infrared radiation with exclusion of the radiation coming from unconcerned regions (the radiation from other regions of the subject's body, for example), as well as correct estimate of the frontal temperature and the room temperature so as to achieve the real patient's temperature in a reliable manner.

The foregoing and further objects that will be apparent in the following specification are substantially achieved by an apparatus and a method in accordance with the invention.

Further features and advantages will be best understood from the detailed description of a preferred but not exclusive embodiment of a temperature measuring device, in particular of a patient, and the relevant measurement method in accordance with the present invention.

This description will be set out hereinafter with reference to the accompanying drawings, given by way of non-limiting example, in which:

FIG. 3 shows a waveguide plus sensor of the thermometer shown in FIGS. 1 and 2; and FIG. 4 diagrammatically shows an alternative embodiment of the temperature measuring device seen in FIG. 2.

With reference to the drawings, a temperature measuring device, particularly for measurement of a patient's temperature, has been generally identified with 100.

Figure 1:
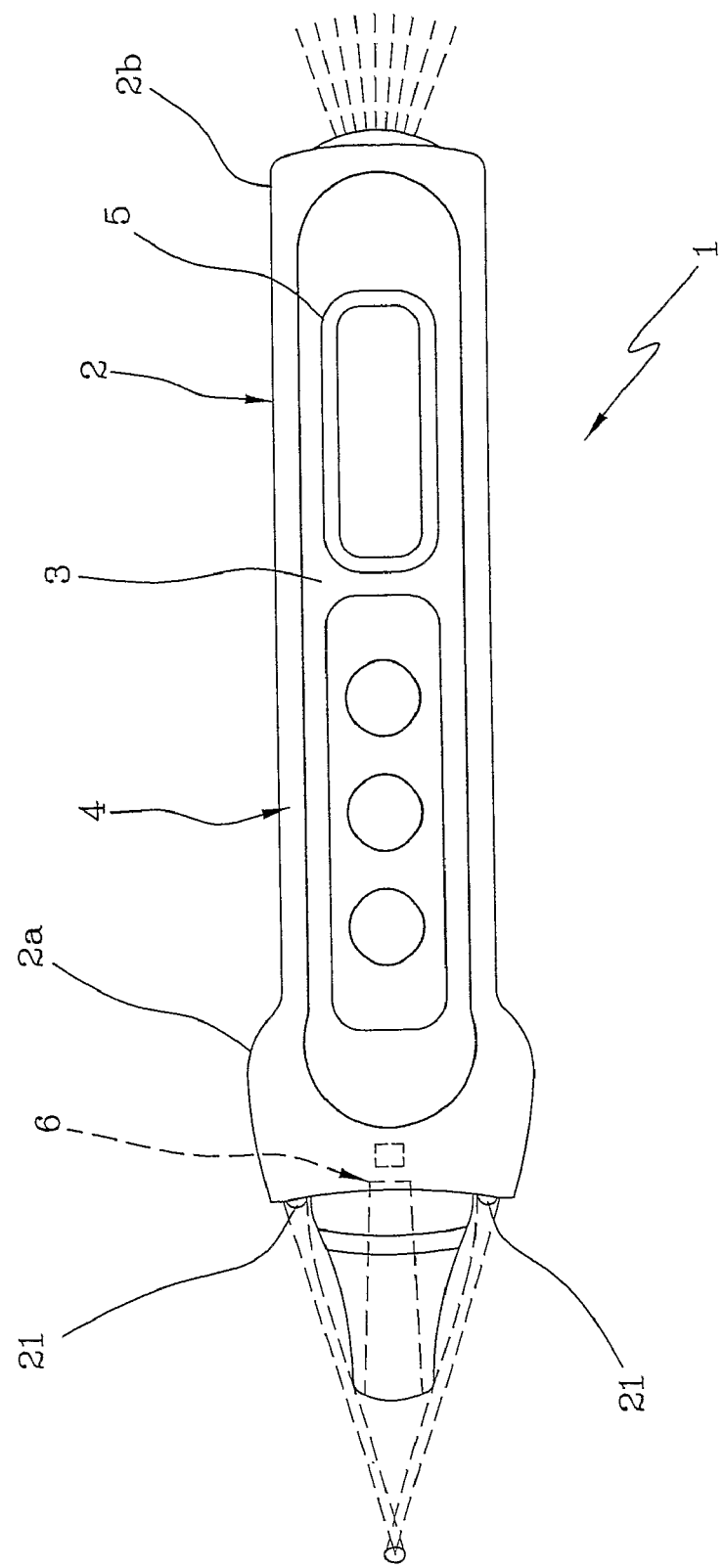
FIG. 1 is a diagrammatic view of an infrared thermometer assembly.

As viewed from FIG. 1, the infrared thermometer 1 can be of the portable type and it comprises a main holding body 2 defining a grasping region 3 for the user. The handgrip can have conventional command means 4 such as keypads and the like, as well as one or more displays 5 possibly for temperature or other information reading.

At one end of the main body, means 6 for detecting the infrared temperature is provided which comprises a sensor member 7 sensing the infrared radiation and at least one waveguide 8 operatively associated with the sensor member to suitably convey thereto the radiation emitted from the region of the body 9 the thermal level of which is wished to be measured.

Obviously, in case of contact or sliding thermometers use of any type of waveguide can be selectively avoided.

Advantageously, the temperature measuring device is provided with means for controlling the correctness/steadiness of the room-temperature value used by the thermometer.

As already mentioned, the infrared thermometer 1 is provided to detect the temperature of a surface portion 9 of a patient by means of the sensor member 7, to be subsequently able to estimate the true inner temperature of same.

As previously highlighted, for the purpose of estimating the true temperature, it is also necessary to know the room temperature where the patient is. In fact, the outer surface temperature of a subject is generally affected by the room temperature where the patient is and different from the true inner temperature of same. Obviously, based on the room temperature, a corrective parameter can be established which is adapted to act on the true surface temperature measured by the sensor member 7 to obtain a reliable reading of the patent's true inner temperature.

In other words, for each infrared thermometer 1 a measurement of the room temperature is required which must be as reliable as possible, and in particular a measurement of the room temperature where the patient is.

Figure 2:
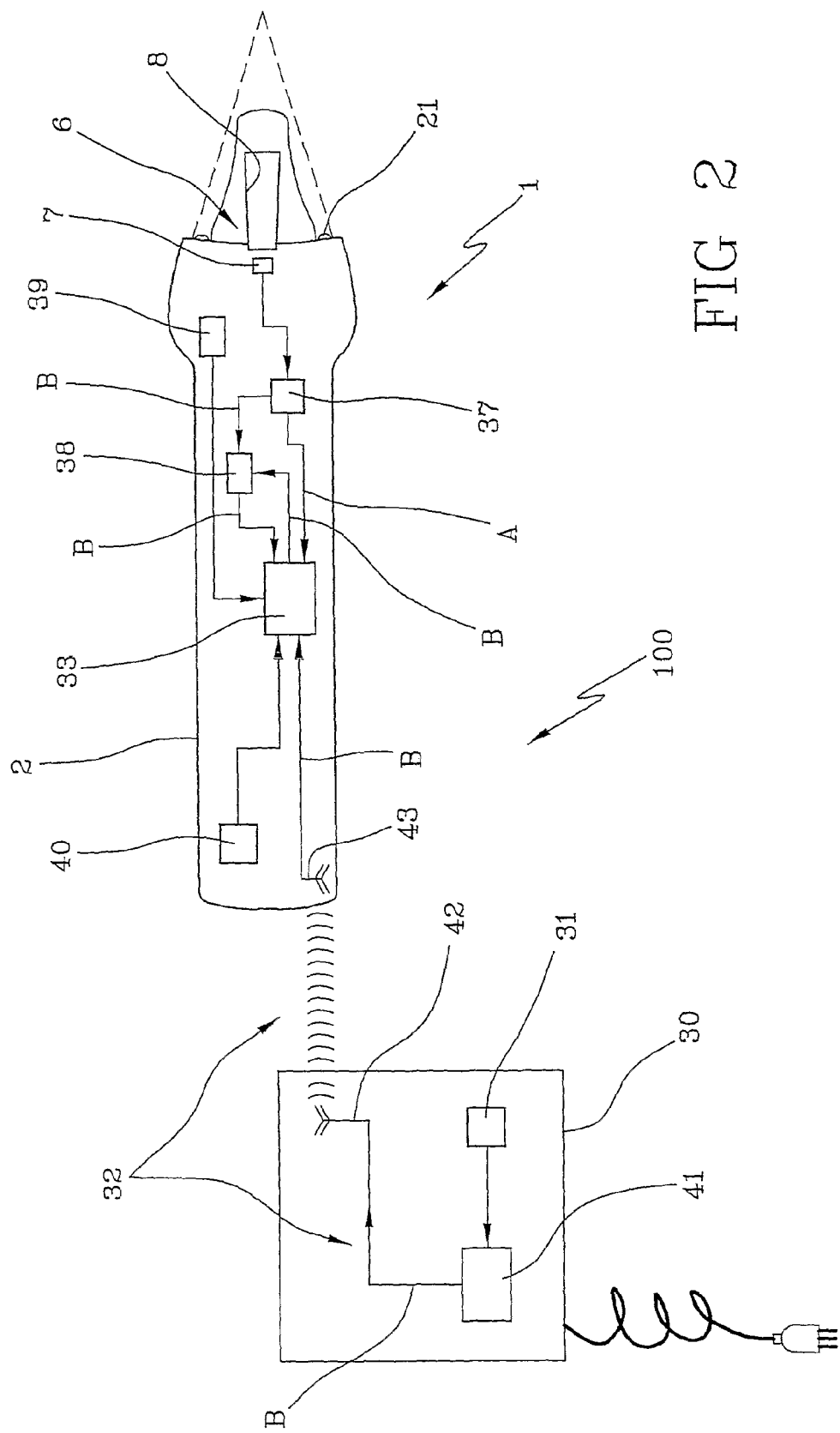
FIG. 2 is a diagrammatic view of the temperature measuring device in accordance with the present invention.

In this connection and as shown in FIG. 2, the temperature measuring device can comprise a container or support 30 separated from the infrared thermometer and designed to communicate the room temperature to the latter.

To this aim use of a remote sensor 31, a thermistor for example, is provided which is designed to detect the room temperature; the thermistor 31 will be housed in a circuit external to the infrared thermometer, power supplied by a mains outlet or suitable battery, for example; the same circuit can contemplate the presence of displaying means such as a display enabling reading of the room temperature detected by the remote sensor 31.

Generally the support 30 will be permanently positioned in a place where the temperature measurement is to be carried out in such a manner that the remote sensor 31 can detect the true room temperature irrespective of the place where the infrared thermometer is kept and of the temperature variations to which said infrared thermometer is submitted.

In particular, by communication means 32, the room temperature detected by the remote sensor 31 will be transmitted to the infrared thermometer.

Sensor 31 sends the detected-temperature signal to a control unit 41 which through a suitable antenna or transmitter 42, communicates the measurement via radio, infrared emission or equivalent system, to a corresponding antenna or receiver 43 present on the thermometer 1.

The infrared thermometer generally also comprises a processing unit 33 which is associated in a circuit to the sensor member 7 to receive therefrom the temperature signal A proportional to the infrared radiation perceived by the sensor member itself and coming from the patient.

This processing unit 33 will be also designed to receive as an input the room-temperature signal B from the remote sensor 31. Alternatively, the processing unit 33 will be able to immediately use this room-temperature signal B or transfer it to a memory 38 for use at a subsequent time.

Before, during or after carrying out the temperature measurement on a patient, the processing unit 33 will receive as an input the room temperature signal B and the temperature signal proportional to the infrared radiation A; the room temperature signal B will enable the processing unit 33 to determine a corrective parameter which may be a positive, negative or zero parameter, to rectify the temperature detected by the sensor member 7 and determine the patient's true inner temperature.

In this connection, the processing unit 33 will comprise suitable parameterized corrective functions that, depending on the room temperature, will determine said corrective parameter that in turn will enable a reliable reading of the patient's true inner temperature to be obtained.

In an alternative embodiment shown in FIG. 4, the temperature measuring device will advantageously comprise a reference element 36 at room temperature which is distinct from the infrared thermometer 1 and positioned in the environment whose temperature is wished to be known.

In other words, this reference element 36 can consist of a plate or disc preferably of plastic material, hanging from or attached to a wall point in the environment whose temperature is to be detected, far from heat or cooling sources, or from sunbeams.

More generally, the reference element 36 can even consist of any body, wall or piece of furniture in a given environment, provided it has been therein for a sufficiently long time (so as to have a stabilised temperature) and is not positioned too close to heat sources or excessively cold points. In other words, this reference element 36 will take the exact room temperature as required for optimal operation of the thermometer.

When the operator designed to carry out the temperature measurement enters the room where the patient is, he/she sets himself/herself in front of the plate 36 with the infrared thermometer, points said thermometer to the centre of the reference element 36 and using a suitable room temperature-loading function, measures the infrared radiation coming from the reference element 36 itself by means of the sensor member 7 (thereby determining the temperature as a function thereof).

At this point suitable means 37 for detecting the temperature of the reference element 36 deviates the measured temperature signal B towards a memory 38 in which the received value is substituted for the one previously stored as the room temperature to be used during all subsequent measurements on patients.

Then the operator can use the thermometer to measure the patient's forehead temperature still by the same sensor member 7 that this time will detect the temperature signal A sent to the previously mentioned processing unit 33.

Said processing unit 33 will utilise the patient's temperature signal A and the room-temperature signal B stored in memory 38 to determine the true value of the patient's inner temperature.

By way of example, this operating method could be advantageous for temperature measurements carried out on patients in a hospital room where the nurse will have the same room-temperature reference for all patients in the same room and will be able to reset the correct room temperature on moving to the subsequent room.

The temperature detecting means 37 of the reference element 36 can obviously be activated by the operator that by pressing a predetermined button will signal to the thermometer that the room temperature B is about to be detected, by pressing a different button or the same buttons but using a different modality will signal to the thermometer that on the contrary the detected temperature A is the patient's temperature.

As a further alternative, it is to be pointed out that the infrared thermometer 1 can be provided with a first and a second room-temperature sensors 39, 40 that are internal to the main holding body and both designed to detect the external-environment temperature and to transmit it to the processing unit 33.

This processing unit 33 will receive as an input the temperature signals from sensors 39, 40 and calculate the room temperature depending on the two detecting operations carried out (note that three or more sensors could possibly be used).

In a simpler embodiment, the processing unit 33 will take the lower value measured by the two thermistors as the room-temperature value; this embodiment is based on the assumption that if the thermometer becomes hot due to an unstable situation (handling of same or because it is in a pocket), this does not occur in all its structure in a constant manner.

As an alternative, a software can be also implemented such that the microprocessor can estimate the true room temperature calculating it as a value that is a function of the difference between the temperatures supplied by the two thermistors 39, 40.

As a further alternative embodiment for room temperature control and verification, said temperature can be continuously detected by a single temperature sensor 39 or 40 transmitting the detected temperature to the processing unit 33 constantly in time. The processing unit 33 will store into memory 38, as the room temperature, the last temperature that remained constant in value and time. The room temperature will be generally considered as constant in value if it keeps within a predetermined variation threshold, within a variation of 0.2°, for example. Constancy in time will be established by giving the measurements a predetermined duration parameter, 15 seconds for example, or also 1 or more minutes.

Should temperature keep constant in value (with a variation not exceeding 0.2°) and in time (unchanged for more than 15 seconds or more than 1 or several minutes), this temperature would be stored into memory 38 and used as the room temperature to carry out the necessary rectifications to the temperature detected on the patient.

It is apparent that should the thermometer be transferred between different environments or also introduced into an operator's pocket, the detected room-temperature variations would be disregarded, thus avoiding errors being introduced into the measurement to be carried out.

Obviously the processing unit 33 is able, through suitable algorithms, to generate a thermal reading that is then transferred to the display or shown to the user through other displaying systems, such as a projection system for example.

With reference to the other parts of the infrared thermometer 1, it is to be pointed out that the waveguide 8 has a first end 8a facing the body whose temperature is wished to be known, and a second end 8b facing the sensor member 7.

As can be viewed from the accompanying drawings (FIG. 3), the waveguide is structured like a tubular body having a mirror-like inner surface 10 defining a passage capable of bringing the first and second mutually-opposite openings, 11 and 12, of the tubular body into optical communication.

The inner surface 10 of the waveguide has a converging extension towards the second opening 12, i.e. its inner diameter becomes increasingly smaller on moving from the first opening 11 of the waveguide 8 to the second opening where the sensor member 7 is substantially located. More specifically, the waveguide convergence is increasingly more marked as the second opening 12 of the tubular body is approached.

In other words, the wave guide in accordance with the present invention can have two or more axially consecutive sections having their respective convergence which is constant in each section and progressively more marked going from one section to the subsequent one in the direction of the second opening 12 of the tubular body defining the waveguide.

Practically, in the just described case, at least the converging portion of the waveguide will appear as a succession of frustoconical surfaces tapering of which is increasingly more marked as the second opening 12 is approached.

Alternatively, in place of two or preferably a plurality of consecutive sections with greater and greater convergence, a wave guide can be provided in which the inter surface is curved and progressively and continuously converges in a more and more marked manner from the first opening towards the second opening.

At all events, the waveguide in accordance with the invention is such made that, the axial moving forward close to the second opening being the same, the diametric reduction becomes bigger and bigger on moving from the first to the second opening.

In the waveguide shown by way of example, it is possible to notice that the inner surface 10 of the waveguide is defined by arched lines 13, 14 and, preferably, by arcs of conic sections with an axis coincident with the longitudinal symmetry axis L of the waveguide and the concavity of which faces the first opening 11.

As shown, the convergence of these parabola arcs is always greater on moving closer to the second opening 12.

Advantageously, the waveguide in accordance with the invention at the first opening can have no protection masks such as those typically provided on traditional waveguides for these uses and therefore it must be submitted to periodic cleaning by the users to ensure the necessary performance. The possible absence of a protection mask is very advantageous because a useless loss of signal in the radiation entering the waveguide is avoided.

It is to be pointed that that, irrespective of the structure given to the waveguide 8, said waveguide as well as the sensor member 7 operatively associated therewith are typically housed within an auxiliary tubular body 20 of metal material, preferably copper or a Zn+Al+Mg alloy, shown in particular in FIG. 3, although they can form a single structure.

The infrared thermometer in accordance with the present invention can also be provided with control means operatively associated with the holding body and co-operating with the processing unit; this control means is designed to determine a condition of correct positioning of the sensor member 7 to a predetermined distance "D" from the detection area, which correct-positioning distance is deemed to be optimal for execution of a careful reading and delimitation of the reading area to the concerned region alone.

Obviously all the above highlighted systems can be used on contact and/or sliding thermometers too.

It is clear that in addition to the above described particular shaping of the waveguide in accordance with the invention, a correct positioning of the sensor member to a suitable distance D from the detection surface helps in obtaining a very accurate thermal reading.

For obtaining said control means, different technical solutions can be adopted either alone or in combination with each other.

In particular use of light emitters or pointing lights 21 can be provided (see FIG. 1). In particular, two or three visible light beams can be provided, which must preferably be non-coplanar with each other and convergent.

After describing the temperature measuring device and the infrared thermometer being part thereof from a structural point of view, operation of same is the following.

First of all the room temperature B is detected. This measurement can be carried out following one or more of the above described methods.

Generally the temperature measuring device using infrared radiation can contemplate all the four solutions outlined above that can be selectively activated either by the operator or automatically, depending on the established priorities.

For instance, where all the four possibilities of room-temperature detection were implemented, one could decide to give priority to the temperature transmitting system by the remote sensor 31.

Should said remote sensor be absent (or disabled) the room temperature could in any case be set by exploitation of the reference element 36 through a manual operation. Even if this operation were not carried out, the room temperature would be calculated depending on the temperatures detected by sensors 39 and 40 and, should this option too be disabled, the room temperature would be calculated using the last temperature that remained constant in time and in value and that is stored in memory 38.

After completing calculation of the room temperature and storing it into memory 38 for example, then measurement of the patient's temperature is carried out by conveying the infrared rays coming from the concerned region 9 of the patient by means of the waveguide 8.

By virtue of the shape of the inner surface of the waveguide that progressively converges to an increasingly greater extent on moving close to the sensor member, the following effects are substantially present; the radiation emissions directed parallel to the longitudinal axis of the waveguide or slightly inclined to said axis are conveyed by the waveguide and substantially focused on the sensor member, irrespective of the region where they come into contact with the inner surface of the waveguide.

Conversely, the rays having an excessive inclination and coming from a region of the patient's surface that is not of interest, which can distort the thermal detection, can be returned to the inlet opening of the waveguide following multiple reflections (practically, at each reflection there is an increase in the ray inclination until overcoming 90° relative to the waveguide axis, as represented by the critical ray $r_c$ in FIG. 3).

Generally, due to the conformation of the inner surface of the waveguide the rays having a greater inclination with respect to the longitudinal axis of the waveguide do not succeed in reaching the second opening of the waveguide to which either rays having a small inclination can come (that will strike on the sensor member) or rays that, depending on the inclination, can either be absorbed by an absorber member (if any) or reflected by the end edge of the waveguide (if present), or break against the inner or outer walls of the holding body of the sensor member.

It is however apparent that, due to the conformation given to the waveguide and the detecting portion in its different embodiments herein described, a great reduction in the real detection region of the radiation is obtained and above all a precise definition of same on the surface of the body to be measured; in fact the waveguide represents a kind of optical filter for the radiation coming from directions that are too inclined relative to the longitudinal axis of the guide itself.

Obviously the waveguide 8 and the control means designed to determine the condition of correct operation of the sensor member 7 to the distance "D" of the detection area 9 will enable an optimal measurement of the patient's surface temperature.

From a general point of view, it is to be noted that the different structural and operational features of the above illustrated devices can be combined with each other (as stated in the appended claims, for example), or can also co-exist in a separate and independent manner, giving rise to alternative embodiments of the present invention.

In particular, apart from the inner structure of the infrared thermometer 1, it will be possible to define "apparatuses" that, as they operationally comprise the thermometer 1 inside them, can have the following two sub-assemblies separately or in combination with each other, depending on the specific cases:

- an "active" support 30 separated from the infrared thermometer and having a remote temperature sensor, as well as the suitable communication means to transmit the temperature detected by the remote sensor to the infrared thermometer; and/or
- a "passive" reference element 36 at room temperature, that is separated from the main holding body 2, as well as means 37 for detecting the temperature B of the reference element 36 and set it as the room temperature for the infrared thermometer 1.

In turn, the infrared thermometer in accordance with the invention can have the following sub-assemblies in combination with each other or separately:

- a single room-temperature sensor 39; and/or
- a second room-temperature sensor 40, that will be able to detect a room temperature B in an independent manner with respect to the first sensor 39; and/or
- a processing unit 33 capable of storing a progress in time of the room-temperature signal B and adapted to keep as a reference of the room temperature, the last temperature that remained substantially constant over a predetermined time interval.

Due to the different construction architectures described above, a method of measuring a patient's temperature can be advantageously implemented, which comprises:

a step of measuring a room temperature;

a step of detecting, by an infrared thermometer 1, the intensity of the infrared radiation from a region of interest 9 of a patient (for the purpose of determining the temperature in said region of interest);

a step of correcting the temperature detected in the region of interest depending on the room temperature (in order to determine the patient's real inner temperature).

Advantageously, this method further comprises a step of controlling the stability/correctness of the room temperature used for temperature correction in the region of interest.

Describing this method in more detail, the controlling step comprises a step of acquiring the room temperature from a remote sensor 31 statically put in an environment where measurement can be carried out or in an environment having the same temperature as that of the environment in which measurement is carried out.

Depending on current requirements, the acquiring step can take place via radio, infrared radiation, contact, jack plug, cable, induction, electromagnetic waves, ultrasonic waves, microwaves, transponder or similar remote communication means.

Likewise, the acquiring step too can be automatic and/or upon command by the user. For example, acquisition can take place by the user typing in the value read on the remote apparatus or any other temperature sensor (which can even be a common mercury thermometer rather than an electronic one, but completely independent of the inventive device); the user draws this temperature and transfers it to the infrared thermometer 1 through a keypad incorporated therein or other similar means.

According to the present method, the acquired room temperature value is stored into a memory 38 and used to process a corrective parameter adapted to correct the temperature of the region of interest to determine the patient's real inner temperature; in addition, the controlling step comprises a measurement of the room temperature by detection of the intensity of an infrared radiation from a reference element 36 at room temperature.

Conveniently, the acquired room-temperature value is stored into a memory 38 and is used to process a corrective parameter adapted to correct the temperature of the region of interest to determine the patient's real inner temperature.

In addition, in accordance with the present method, the controlling step may comprise measurement of the room temperature by at least two different room-temperature sensors 39, 40; in this way, the room temperature stored is a function of the two temperatures detected by sensors 39, 40.

Advantageously, the room temperature stored is lower than the detected room temperatures, so as to obtain the greatest reliability and consistency of the correction in accordance with the present method; in particular, the estimate of the real room temperature is obtained by a correction referred to the difference between the temperatures supplied by sensors 39, 40.

The controlling step may comprise a sub-step of verifying whether the detected room temperature is constant in value and in time, the room temperature used for correcting the temperature detected from the region of interest being the last detected value of constant temperature stored.

It is to be noted that in a particularly appreciable embodiment of the present method, the room temperature is considered as constant in value if it remains within a predetermined correction threshold, within variations of 0.2° for example, and at the same time the room temperature is considered as constant in time if it remains within the predetermined correction threshold over a period of time of at least 1 minute or five minutes, for example.

The temperature results produced by the above described method (as claimed in the following) are displayed to the operator using the most appropriate ways depending on current requirements; for instance, the controlling step may comprise a step of direct acquisition, through reading of the room temperature on a display and writing it by means of a possible keypad on the infrared thermometer.

According to a further advantageous feature of the present method, it is also possible to implement a step of predicting a room temperature; in more detail, this predicting step may be obtained by extrapolation (and/or, if necessary, by interpolation) of subsequent temperature values detected by sensors 39, 40 at predetermined time intervals.

In other words, the predicting step may contemplate sampling of different temperature values, so as to be able to construct a "time curve" that typically can tend to an asymptotic value (which, in turn, can be considered as the room temperature to which the thermometer will stabilise after some time). In addition, the possibility of at least partly using physico/mathematical formulas (also already known) can be contemplated to determine stabilisation times and/or room temperature values through calculation.

Conveniently, the predicting step can be put into practice conditionally on verification that both room temperature sensors 39 and 40 will record the same temperature increase or reduction rate; in fact this correspondence condition entails that the infrared thermometer 1 is not subjected to alteration factors of the room temperature (such as the fact that it is held in the operator's hand or it is stowed in a garment pocket close to the human body) and that it is actually exposed to the real temperature of the environment where the patient is.

Operatively, the predicting step comprises a sub-step of determining a positive or negative variation of the temperature of sensors 39, 40 that is uniform in time; following determination of this variation (or in other words, of the "time curve"), it is advantageously possible to identify a corrective parameter depending on the room temperature interpolated and/or extrapolated during the prediction step itself; after this corrective parameter has been defined (which can be calculated based on empirical formulas or obtained by statistical analysis and then stored in the most suitable ways), the method of the present invention can contemplate application of said corrective parameter to the measured temperature.

The step of predicting the room temperature can therefore give rise to the definition of an "expected" value of room temperature of equilibrium that will be calculated and stored in a very short period of time (and will therefore enable immediate use of the thermometer 1) or can serve to start a step of counting a stabilisation time of the thermometer; in the last-mentioned process alternative, instead of establishing the "asymptotic" temperature of the already mentioned "time curve", the time for reaching the asymptotic temperature is established and a "countdown" can be configured (by suitable displaying on the thermometer display, for example), on expiry of which the thermometer will be really stabilised to the room temperature and ready for use with the greatest accuracy and/or precision.

Another particular feature of the present invention resides in that the method herein considered can be applied to different parts of the body whose temperature is wished to be known; for instance, the detection of the intensity of an infrared radiation coming from a "region of interest" 9 of a patient can advantageously comprise a sub-step of detecting the infrared radiation coming from the auricle area.

It is to be noted that, unlike the known methods of temperature detection by introduction of the probe into the auricle, this variant of the method of the invention does not include introduction of a probe into the auricle itself, but on the contrary keeps any measuring object out of said auricle, which is advantageous in terms of non-intrusiveness on the patient.

In order to take into account the fact that usually a patient's forehead is colder than the auricle (since the forehead is more exposed to the environmental air), the present method can also comprise a sub-step of determining an additional corrective parameter; this additional corrective parameter will typically be correlated with the difference of surface temperature existing between the forehead region of a patient and the auricle of the same patient, and obviously the method can contemplate application of said parameter to the temperature measured at the auricle.

Temperature verification by analysis of the auricle is also advantageous if the patient's forehead is not in its optimal conditions for a direct measurement, in the presence of sweat for example or in all cases capable of modifying the characteristics of an infrared emission.

The Invention Achieves Important Advantages.

It will be recognised first of all that the adopted methods enable solution of the problem concerning stabilisation in the thermometer environment.

In fact, each of the methods and devices described enables a more precise detection of the room temperature or possibly a control of same.

It is apparent that adoption of a true and real room temperature allows more reliable measurements to be carried out which are not affected by accidental external events such as variations of the thermometer room temperature that do not correspond to temperature variations in the environment where the subject whose temperature is to be measured is; the invention enables problems to be solved which are connected with situations in which wrong positioning or use of the thermometer (in a physician's pocket for example, or in case of too many manipulations of the thermometer or also in case of a patient's sweaty forehead) could invalidate the temperature measurement.

The above, associated with use of a suitable waveguide capable of reducing the field of view to the real region of interest, as well as with suitable means for positioning the thermometer to the correct distance, enables precise measurements to be obtained which are repeatable and suffer from substantially minimum or zero errors.

In any case all systems for stabilisation/control of the room temperature and the waveguide can be also applied to contact or sliding thermometers.

The invention claimed is:

1. A non-invasive method of measuring the temperature, said method being performed with a thermometer that conveys an infrared radiation to a sensing member spaced from the surface of a subject whose thermal level must be known, the method comprising:
   measuring a room temperature;
   detecting the intensity of an infrared radiation coming from a region of interest of a subject, through an infrared thermometer, to determine the temperature of the region of interest;
   correcting the temperature detected in the region of interest depending on the room temperature to determine the real inner temperature of the subject; and
   controlling the stability/correctness of the room temperature used to correct the temperature of the region of interest;
   wherein detecting the intensity of the infrared radiation does not comprise introduction of a probe into an auricle.

2. A method as claimed in claim 1, further comprising contactless pointing of the thermometer, the contactless pointing detecting the temperature of a given portion of the forehead or head or detecting the temperature of at least one of a temple, a central forehead region, a neck back or an ear region of the subject; and estimating a frontal temperature of the subject whose thermal level must be known.

3. A method as claimed in claim 1, wherein the controlling comprises acquiring the room temperature from a remote sensor statically positioned in an environment where measurement is carried out or in an environment having the same temperature as that of the environment where measurement is carried out.

4. A method as claimed in claim 3, wherein the acquiring takes place by remote communication via one of radio, infrared radiation, contact, jack plug, cable, induction, electromagnetic waves, ultrasonic waves, microwaves, or transponder.

5. A method as claimed in claim 3, wherein the acquiring is automatic or upon command by the user, the acquiring being carried out through writing of a room-temperature datum detected by another thermometer.

6. A method as claimed in claim 1, wherein the acquired room-temperature value is stored in a memory and is used to process a corrective parameter that corrects the temperature of the region of interest to determine the real inner temperature of the subject.

7. A method as claimed in claim 1, wherein the controlling comprises measuring a room-temperature by detection of the intensity of an infrared radiation from a reference element at room temperature.

8. A method as claimed in claim 6, wherein the controlling comprises measurement of the room temperature by at least two different room-temperature sensors the room temperature stored being a function of the two temperatures detected by the sensors.

9. A method as claimed in claim 8, wherein the room temperature stored is lower than the detected room temperatures.

10. A method as claimed in claim 8, wherein an estimate of the real room temperature is obtained by a correction with reference to the difference between the temperatures supplied by the sensors.

11. A method as claimed in claim 6, wherein the controlling comprises verifying whether the detected room temperature is constant in value and in time, the room temperature used for correcting the temperature detected in the region of interest being the last detected value of constant temperature stored.

12. A method as claimed in claim 11, wherein the room temperature is considered as constant in value if it does not go beyond a predetermined correction threshold.

13. A method as claimed in claim 12, wherein the room temperature is considered as constant in time if it remains within the predetermined correction threshold over a period of time of at least 1 minute.

14. A method as claimed in claim 1, wherein the controlling comprises directly acquiring the room temperature, by reading of the room temperature from a display and writing on the infrared thermometer by a keypad or by a voice command.

15. A method as claimed in claim 1, wherein further comprising predicting a room-temperature, the predicting being carried out by at least one of interpolation and extrapolation of subsequent temperature values detected at predetermined time intervals by room temperature sensors, the predicting being carried out upon a verification that both the room-temperature sensors register the same temperature increase or decrease rate.

16. A method as claimed in claim 15, wherein the predicting comprises determining a positive or negative variation of the sensor temperature that is uniform in time.

17. A method as claimed in claim 15, wherein the predicting comprises identifying a corrective parameter as a function of the room temperature of at least one of interpolated and extrapolated during the predicting and applying the corrective parameter to the measured temperature.

18. A method as claimed in claim 15, wherein the predicting comprises counting a stabilisation time of the thermometer, the counting comprising displaying the stabilisation time.

19. A method as claimed in claim 15, comprising further comprising determining at least one additional corrective parameter, at least one additional corrective parameter being correlated with a surface-temperature difference existing between a frontal region and an auricle of the subject and applying the additional corrective parameter to the measured temperature.

20. A non-invasive thermometer for temperature measurement, said thermometer being configured to convey an infrared radiation to a sensing member spaced from a surface of a subject whose thermal level must be known, the thermometer performing by measuring a room temperature, detecting the intensity of an infrared radiation coming from a region of interest of a subject, through an infrared thermometer, to determine the temperature of said region of interest, correcting the temperature detected in the region of interest depending on the room temperature to determine the real inner temperature of the subject; and controlling the stability/correctness of the room temperature used to correct the temperature of the region of interest, wherein detecting the intensity of the infrared radiation does not comprise introduction of a probe into an auricle, the thermometer comprising:
a main holding body that define at least one grasping region for a user; a detector that detects an infrared radiation emitted from a subject whose temperature is to be measured, said detector being operatively associated with the main holding body and having at least one sensor member that senses infrared radiation intensity; a first room-temperature sensor that detects the temperature of a surrounding environment; and a processor operatively associated with the sensor member and the first room-temperature sensor and configured to receive, from the first room-temperature sensor, a temperature signal proportional to the infrared radiation sensed by the sensor member and a room-temperature signal respectively, wherein the processor stores a time development of the room-temperature signal, the processor keeping, as the reference of the room temperature, the last temperature that remained substantially constant over a predetermined time interval.

21. A thermometer as claimed in claim 20, wherein the room temperature is considered as constant when the maximum range of the room temperature is lower than a predetermined threshold.

22. A thermometer as claimed in claim 20, wherein the time interval during which the temperature must be constant is greater than 15 seconds.

23. A thermometer as claimed in claim 20, wherein the processor receives as an input, the room-temperature signal and the temperature signal proportional to the infrared radiation, the room-temperature signal enabling the processor to determine a positive or negative corrective parameter to correct the temperature detected by the sensor member and to determine the real temperature of the subject.

24. A thermometer as claimed in claim 20, further comprising a controller operatively associated with the processor and that determines a condition of correct positioning of the sensor member at a predetermined distance from the detection area.

25. A thermometer as claimed in claim 20, further comprising a second sensor that detects the temperature of a surrounding environment, said second sensor configured to detect a room temperature with respect to the first sensor the room temperature being established taking the temperature value of the first or the second sensor or a value of the measurement interval between the two sensors when the difference between the two measurements is lower than a predetermined threshold.

26. non-invasive thermometer for temperature measurement, said thermometer being configured to convey an infrared radiation to a sensing member spaced from the surface of a subject whose thermal level must be known, the thermometer performing by measuring a room temperature, detecting the intensity of an infrared radiation coming from a region of interest of a subject, through an infrared thermometer, to determine the temperature of said region of interest, correcting the temperature detected in the region of interest depending on the room temperature to determine the real inner temperature of the subject; and controlling the stability/correctness of the room temperature used to correct the temperature of the region of interest, wherein detecting the intensity of the infrared radiation does not comprise introduction of a probe into an auricle, the thermometer comprising:
a main holding body that defines at least one grasping region for a user; a detector that detects an infrared radiation emitted from a body whose temperature is to be known, said detector being operatively associated with the main holding body and having at least one sensor member that senses the infrared radiation intensity, a support spaced from the main holding body and having a remote temperature sensor and a communicator that transmits a temperature detected by the remote sensor to said infrared thermometer.

27. A thermometer as claimed in claim 26, wherein the remote temperature sensor is a thermistor that detects a room temperature.

28. A thermometer as claimed in claim 26, is wherein the communicator comprises a wireless remote communicator that communicates by one of radio, infrared radiation, induction, or with a transponder.

29. A thermometer as claimed in claim 26, wherein the support is statically positioned within an environment or room, the remote sensor being provided with power supplied by a battery or a mains outlet.

30. A thermometer as claimed in claim 26, further comprising a processor operatively associated with the sensor member and that receives, from the sensor, a temperature signal from the subject that is proportional to the infrared radiation sensed by the sensor member.

31. A thermometer as claimed in claim 30, wherein the processor receives a room-temperature signal sent by the remote temperature sensor.

32. A thermometer as claimed in claim 30, wherein the processor receives, as an input, the room-temperature signal and the temperature signal proportional to the infrared radiation, the room-temperature signal enabling the processor to determine a positive or negative corrective parameter to correct the temperature detected by the sensor member and to determine the real temperature of the subject.

33. A non-invasive thermometer for temperature measurement, said thermometer being configured to convey an infrared radiation to a sensing member spaced from the surface of a subject whose thermal level is to be measured, said thermometer performing by measuring a room temperature, detecting the intensity of an infrared radiation coming from a region of interest of a subject, through an infrared thermometer, to determine the temperature of said region of interest, correcting the temperature detected in the region of interest depending on the room temperature to determine the real inner temperature of the subject; and controlling the stability/correctness of the room temperature used to correct the temperature of the region of interest, wherein detecting the intensity of the infrared radiation does not comprise introduction of a probe into an auricle, the thermometer comprising:

a main holding body that defines at least one grasping region for a user a detector that detects an infrared radiation emitted from a subject whose temperature is to be known, the detector being operatively associated with the main holding body and having at least one sensor member of the infrared radiation intensity;

a first room-temperature sensor provided to detect the temperature of a surrounding environment; and a processor operatively associated with the sensor member and the first room-temperature sensor and that receives therefrom a temperature signal proportional to the infrared radiation sensed by the sensor member and a room-temperature signal respectively the processor storing a time development of the room-temperature signal the processor keeping, as the reference of the room temperature, the last temperature that remained substantially constant over a predetermined time interval and further comprising a reference element at room temperature spaced from the main holding body and a detector that detects the temperature of said reference element and sets the temperature of the reference element as the room temperature for the infrared thermometer.

34. A thermometer as claimed in claim 33, the processor configured to receive, from the sensor member, a temperature signal that is proportional to the infrared radiation sensed by the sensor member and coming from the subject.

35. A thermometer as claimed in claim 33, further comprising a memory configured to store one or more room temperatures, said detector detects the temperature of said reference element and selectively replaces the room temperature stored in the memory with the temperature detected by said reference element.

36. A thermometer as claimed in claim 33, said processor being configured to receive, as an input, a room-temperature signal, said room-temperature signal coming from said memory and corresponding to the temperature of said reference element.

37. A thermometer as claimed in claim 33, said processor being configured to receive, as an input, the room-temperature signal and the temperature signal proportional to the infrared radiation, the room-temperature signal enabling the processor to determine a positive or negative corrective parameter to correct the temperature detected by the sensor member and to determine the real temperature of the subject.

38. A thermometer as claimed in claim 33, wherein the reference element comprises a plate, positioned far from heat or cooling sources.

39. A thermometer as claimed in claim 33, further comprising at least one first and one second room-temperature sensors in engagement with the main holding body and configured to independently detect a room temperature.

40. A thermometer as claimed in claim 39, wherein the first and second room-temperature sensors are positioned on opposite sides of the main holding body.

41. A thermometer as claimed in claim 39, the processor configured to receive from the at least one sensor member, a temperature signal proportional to the infrared radiation sensed by the at least one sensor member.

42. A thermometer as claimed in claim 41, wherein the processor receives, as an input, the temperature signals from the room-temperature sensors and estimates the room temperature based upon two temperature detecting operations.

43. A thermometer as claimed in claim 39, wherein the room temperature is established taking the lower temperature value detected by the room-temperature sensors.

* * * * *